US009732982B2

(12) United States Patent
Devriendt et al.

(10) Patent No.: US 9,732,982 B2
(45) Date of Patent: Aug. 15, 2017

(54) BOILER UNIT

(75) Inventors: James Devriendt, West Sussex (GB); Christopher John Evans, West Sussex (GB); Robert Morgan, West Sussex (GB); Paul Barnard, West Sussex (GB); Bruce Girvan, West Sussex (GB)

(73) Assignee: Ceres Intellectual Property Company Limited, West Sussex (GB)

( * ) Notice: Subject to any disclaimer, the term of this patent is extended or adjusted under 35 U.S.C. 154(b) by 1465 days.

(21) Appl. No.: 13/131,406

(22) PCT Filed: Nov. 26, 2009

(86) PCT No.: PCT/GB2009/002760
§ 371 (c)(1),
(2), (4) Date: Sep. 8, 2011

(87) PCT Pub. No.: WO2010/061190
PCT Pub. Date: Jun. 3, 2010

(65) Prior Publication Data
US 2012/0135321 A1    May 31, 2012

(30) Foreign Application Priority Data

Nov. 27, 2008   (GB) .................................. 0821700.2

(51) Int. Cl.
*F24H 9/20*          (2006.01)
*F24H 1/00*          (2006.01)
(Continued)

(52) U.S. Cl.
CPC ........... *F24H 9/2007* (2013.01); *F24D 12/02* (2013.01); *F24H 1/0036* (2013.01); *F24H 1/08* (2013.01);
(Continued)

(58) Field of Classification Search
CPC .. F24D 12/02; F24D 2200/04; F24D 2200/19; F24H 1/08; F24H 1/22;
(Continued)

(56) References Cited

U.S. PATENT DOCUMENTS 7,284,709 B2 * 10/2007 Guyer ......................... 237/12.1
2003/0031900 A1    2/2003 Tajima et al.
(Continued)

FOREIGN PATENT DOCUMENTS

CN          1455966 A      11/2003
DE          10000406        7/2000
(Continued)

OTHER PUBLICATIONS

BDR Thermea, "Extensive Product Portfolio—From High Efficiency Boilers to Renewable Technologies," Baxi Ecogen micro CHP device Micro CHP based on a Sterling engine: http://www.bdrthermeaspecification.co.uk/campaigns/about-the-ecogen.htm, Accessed on Oct. 25, 2011, 3 pages.
(Continued)

*Primary Examiner* — Sarah A Slifka
(74) *Attorney, Agent, or Firm* — Baker & Hostetler LLP

(57) ABSTRACT

A boiler unit (100) housed in an enclosure, the boiler unit (100) configured to receive a solid state combined heat and power generating device (130). The boiler unit (100) comprises a heating device (110) to produce heat; and a control unit (120) to independently control each of the heating device (110) and the solid state combined heat and power generating device (130). The boiler unit (100) is operable without the solid state combined heat and power generating device (130) being present.

21 Claims, 5 Drawing Sheets

(51) Int. Cl.
  *F24H 1/08* (2006.01)
  *F24D 12/02* (2006.01)
  *F24H 1/22* (2006.01)
  *F24H 9/06* (2006.01)
  *F24H 9/14* (2006.01)

(52) U.S. Cl.
  CPC ............... *F24H 1/22* (2013.01); *F24H 9/06* (2013.01); *F24H 9/14* (2013.01); *F24H 9/148* (2013.01); *F24D 2200/04* (2013.01); *F24D 2200/19* (2013.01); *F24H 2240/00* (2013.01); *F24H 2240/04* (2013.01); *F24H 2240/10* (2013.01); *F24H 2240/12* (2013.01); *H01M 2250/405* (2013.01); *Y02B 10/70* (2013.01); *Y02B 30/14* (2013.01); *Y02B 90/16* (2013.01); *Y02E 20/14* (2013.01); *Y02T 10/166* (2013.01)

(58) Field of Classification Search
  CPC . F24H 1/0036; F24H 9/06; F24H 9/14; F24H 9/148; F24H 9/2007; F24H 2240/00; F24H 2240/04; F24H 2240/10; F24H 2240/12; H01M 2250/405
  USPC ............ 429/13, 26, 410; 122/141; 237/12.1; 60/39.01, 517, 520
  See application file for complete search history.

(56) References Cited

U.S. PATENT DOCUMENTS

| | | | |
|---|---|---|---|
| 2007/0028611 A1* | 2/2007 | Johnston et al. | ............... 60/520 |
| 2008/0118800 A1* | 5/2008 | Devriendt et al. | ............... 429/26 |
| 2009/0004516 A1* | 1/2009 | Bai | ..................... C01B 3/384 |
| | | | 429/436 |

FOREIGN PATENT DOCUMENTS

| | | | | |
|---|---|---|---|---|
| DE | 10111072 | 10/2002 | | |
| EP | 1030123 | 8/2000 | | |
| EP | 1835240 | 9/2007 | | |
| GB | 2376271 | 12/2002 | | |
| GB | 2376271 A | * 12/2002 | ............. | F02G 1/055 |
| GB | 2406901 | 4/2005 | | |
| GB | 2410790 | 8/2005 | | |
| GB | 2441849 | 3/2008 | | |
| GB | 2451000 | 1/2009 | | |
| JP | 2004-532507 A | 10/2004 | | |
| WO | WO 02/091508 A2 | 11/2002 | | |
| WO | WO 2004/101982 | 11/2004 | | |
| WO | WO 2008/084228 | 7/2008 | | |

OTHER PUBLICATIONS

Honda, News Releases 2007: "Honda's Compact Household Cogeneration Unit Achieves Cumulative Sales of 50,000 Units in Japan," dated Jul. 17, 2007, Honda: http://world.honda.com/news/2007/c070717Compact-Household-Cogeneration-Unit/, Accessed on Oct. 25, 2011, 2 pages.

International Patent Application No. PCT/GB2009/002760: International Search Report and Written Opinion dated Jul. 16, 2012, 18 pages.

m-CHP Appliance, "Make your own home or small business a Power House of Energy," Discenco; Sterling Engine Micro CHP System: http://www.disenco.com, Accessed on Oct. 25, 2011, 1 page.

* cited by examiner

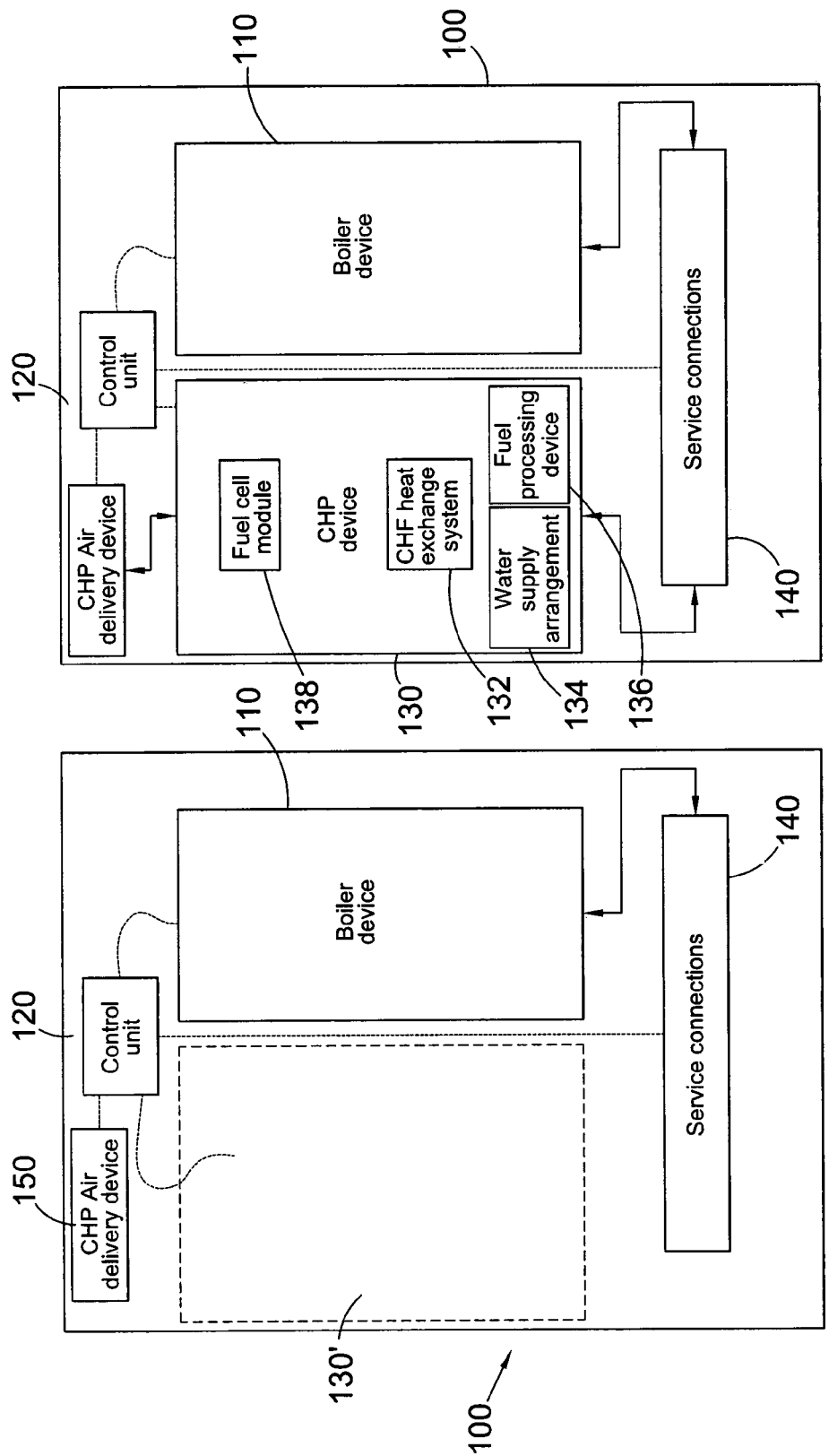

BOILER UNIT

CROSS-REFERENCE TO RELATED APPLICATIONS

This application is the National Stage of International Application No. PCT/GB2009/002760, filed Nov. 26, 2009, which claims the benefit of Great Britain Application No. 0821700.2, filed Nov. 27, 2008, the disclosures of which are incorporated herein by reference in their entireties.

FIELD OF THE INVENTION

The invention relates to a boiler unit, particularly, but not limited to, a domestic boiler unit for providing heating to a domestic dwelling.

BACKGROUND OF THE INVENTION

Boilers are provided within domestic dwellings to provide a source of heating. Such boilers are typically contained in an enclosure, which may be removable and such a boiler would be a contained boiler unit. Such boilers are typically wall mounted or floor mounted. The heating is generally provided as space heating for heating of the dwelling and hot water heating to provide a source of hot water to the dwelling. Such units may be powered from the electricity grid, or by a gas supplier; the gas being burnt to heat water in a boiler, to be provided to the space heating system and/or the hot water storage tank, as required.

In some instances space heating may be referred to as central heating.

The present invention seeks to improve the prior art, or overcome or ameliorate at least one of the problems associated with the prior art.

SUMMARY OF THE INVENTION

According to a first aspect of the invention, there is provided a boiler unit configured to receive a solid state combined heat and power generating device (CHP device), the boiler unit comprising a heating device to produce heat, and a control unit to independently control each of the heating device and the CHP device, wherein the boiler unit is operable without the CHP device being present. The boiler may be housed in an enclosure. The boiler unit may be modular. The enclosure may be removable, and/or may have an opening into which the solid state combined heat and power generating device may be installed. The enclosure may include a void to receive the CHP device. The enclosure may form part of the boiler unit.

Instead of the solid state combined heat and power generating device, a stirling or rankine engine may be provided to generate heat and power, and the boiler unit may be configured to receive such a stirling or rankine engine, rather than a solid state combined heat and power device.

The boiler unit may be a unitary device and the elements of the boiler unit may all be housed within a single enclosure.

The design may provide a boiler unit for providing space and/or hot water heating where the boiler unit can be installed and operated as part of a domestic or commercial heating system and/or hot water provision system. The boiler unit may contain a boiler device that contains a controllable air blower, at least one main heat exchanger unit, where the at least one main heat exchanger unit provides the mechanism for transferring thermal energy from burning the fuel supply in the boiler device to a transfer fluid to provide heat to the space heating system and/or provides thermal energy to the hot water system and/or a thermal store, and where the boiler unit design allows for subsequent fitting of a CHP device into the boiler unit.

The CHP device, when installed within the boiler unit, may produce heat for hot water and may also produce heat for space heating and also produce electricity for use by the boiler unit and optionally for an electrical load attached to the boiler unit.

The CHP device may produce heat for hot water and may also produce heat for space heating by using a CHP heat exchanger arrangement that is not the same as the main heat exchanger unit.

The CHP device may be a fuel cell based CHP device. The CHP device may be a solid oxide fuel cell based device. The CHP device may be a solid oxide fuel cell based device, referred to as a fuel cell module. The CHP device may include a fuel cell stack. The CHP device may include a solid oxide fuel cell stack.

The fuel cell module may include a fuel cell stack assembly, a cover around the fuel cell stack assembly, a fuel cell stack compression means, a base plate to which the fuel cell stack assembly and cover and fuel cell stack compression means are connected, a tail gas burner unit, a fuel reformer processing unit (including a steam generator, a steam and fuel gas mixer, a steam reformer unit, a heat exchange unit to transfer thermal energy from the reformate exiting the reformer area to the seam generator unit, a heat exchanger to transfer thermal energy from the exhaust stream from the tail gas burner unit to the fuel processor unit) electrical connections to the sensors contained within the fuel cell module and power leads connected to the electrical output points from the fuel cell stack assembly, and a gas to gas heat exchange unit for allowing thermal energy to be transferred between the exhaust gas exiting from the steam generator heat exchanger unit and the incoming oxidant gas to the fuel cell module, and piping to connect the components of the fuel cell module together and connect to the boiler unit, and thermal insulation means providing thermal insulation significantly around the fuel cell module.

The CHP device may be installed into the boiler unit after the boiler unit has been installed.

The CHP device may be installed into the boiler unit after the boiler unit has been installed and after the boiler device has been operated.

The control unit may also include power electronics for converting the electrical output of the CHP device into suitable form for use in the boiler unit and for use outside the boiler unit.

The control unit may allow for connection of the boiler unit to the electrical grid for use of the electrical grid to power the boiler unit and/or to export electrical power from the boiler unit to the grid.

The control unit may allow the boiler unit to disconnect from the electrical grid in the event that operation of the grid requires the boiler unit to disconnect from the grid.

The control unit may allow the boiler unit to connect to the grid after the boiler unit has disconnected from the grid.

The control unit may allow the boiler unit to connect to the grid after the boiler unit has been installed.

The control unit may allow the boiler unit to connect to the grid after the boiler unit has been serviced.

The control unit may allow the boiler unit to operate when the CHP device is not present.

A main heat exchanger may be provided for the boiler device; it may be a condensing type heat exchanger.

A CHP heat exchange system may provided, which may be separate from the main heat exchanger, for transferring heat for space heating and/or hot water; this may also be a condensing type heat exchanger arrangement.

Two separate heat transfer systems may be provided. In this case, one heat transfer system operates with the boiler device, while the other operates with the CHP device. In this way, independent operation of the two devices can be achieved. A heat transfer medium used in the heat transfer systems may be water. The two systems may be connected to a single thermal store, or to two separate thermal stores.

The CHP heat exchange system may consist of a condensing heat exchanger unit in the SOFC stack anode off gas flow path and a condensing heat exchanger in the CHP device post clean-up (tail gas) burner exhaust flow path.

The CHP heat exchange system may additionally include a heat exchanger unit for transferring some of the thermal energy in the SOFC stack anode off gas to the oxidant feed to the SOFC stack.

The CHP heat exchange system may be included as part of the CHP device. The CHP heat exchange system may alternatively be included as part of the installed boiler unit. The fuel supply arrangement to the CHP device may include a fuel gas pump unit and a pulsation dampener. The fuel supply to the CHP device may include a gas manifold block with gas isolation valves for supplying fuel gas to the tail gas burner unit when the tail gas burner acts as a start-up burner, and for the fuel supply to the fuel processing unit in the fuel cell module.

The fuel supply arrangement to the CHP device may include a low temperature fuel gas desulphurisor unit. The gas desulphurisor unit may include a gas desulphurisation component that is housed in a replaceable unit that can be changed as part of the normal boiler unit maintenance and service. The gas desulphurisor may be a dummy gas desulphurisor unit when the boiler unit is installed without the CHP device. The dummy gas desulphurisor unit may be replaced with an active gas desulphurisor unit when the CHP device is installed. The fuel supply arrangement for the CHP device may be included as part of the CHP device. The fuel supply arrangement for the CHP device may alternatively be included as part of the installed boiler unit.

The fuel supply arrangement for the CHP device may be included as part of the CHP device. The CHP heat exchange system may alternatively be included as part of the installed boiler unit. The fuel supply arrangement to the CHP device may include a fuel gas pump unit and a pulsation dampener.

The fuel supply to the CHP device may include a gas manifold block with gas isolation valves for supplying fuel gas to the tail gas burner unit when the tail gas burner acts as a start-up burner, and for the fuel supply to the fuel processing unit in the fuel cell module.

A water supply arrangement may be provided, which may receive water from at least one of the CHP device condensing heat exchangers. The water supply arrangement may include a water treatment device, which may be replaceable. The water supply arrangement may include an isolation valve between the water treatment device and the CHP device. The water treatment device may include a deioniser unit, which may be replaceable. The water treatment device may also include a controllable water pump. The water treatment device may be housed in a replaceable unit that can be changed as part of normal boiler maintenance and service. An overflow of the water supply arrangement may be connected to the same condensate drain as that from the at least one main heat exchanger of the boiler device. A water supply arrangement for the CHP device may be included as part of the CHP device. A water supply arrangement for the CHP device may be included as part of the installed boiler unit.

The CHP device may include a fuel processing device. The fuel processing device may include a reformer unit. The fuel processing device may include a reformer unit. The fuel processing device may include a reformer unit including a steam reforming area and a steam generator. The fuel processing device optionally includes a reformate cooling heat exchanger arranged to cool the reformer reformate to close to the inlet stack operating temperature.

The CHP device may include a fuel cell stack off-gas burner unit. The fuel cell stack off-gas burner may include connections that allow it to be fluidly connect to the fuel cell stack anode off-gas and to a start-up fuel supply from the gas manifold block.

The CHP device may include connections allowing it to be fluidly connected to an oxidant supply, the CHP heat exchange system, to the water supply arrangement, to the fuel supply.

The boiler unit may include a controllable CHP air delivery device. The controllable CHP air delivery device may include a controllable motor and a blower assembly. The controllable CHP air delivery device may include a controllable 300-400 VDC motor and a blower assembly.

The control unit may control both the boiler device and the CHP device by a single control unit. A single PCB may be provided in the control unit to control both the CHP device and the boiler. Diagnostics managers may be provided in the control unit, which are independent of one another so that any fault on one device does not prevent the operation of the other device.

A common sensor may be used by both devices, to detect any exhaust flue over-temperature. If this sensor shows a high reading, or a fault is seen in this sensor, then both devices may be controlled to shut down.

If a device is missing (such as just the boiler is installed) then the device's diagnostics may respond that no sensors are present and thus will not allow any start procedure to be operated on that device—the control unit will make that device control remain permanently in the "off" mode. The control unit may control the boiler device independent of the CHP device. The control unit may control the CHP device independent of the boiler. The control unit may allow either device to work independently of one another or together or one device can start and/or stop whilst the other device is operating or is not operating. The control unit may control the electrical power generated by the fuel cell stack. The control unit may regulate the electrical power generated by the fuel cell stack and allows the regulated power to power not only electrical power requirements in the boiler unit, but also those connected to the boiler unit. Where one of the electrical power requirements connected to the boiler unit is the domestic electrical load. Further alternatively one of the electrical power requirements connected to the boiler unit may be the electrical grid. (As per granted patent GB2441849).

The CHP device may include electrical connections connecting the fuel cell stack output to the main boiler control unit. The CHP device may include sensor and control connections that connect to the main boiler control unit. The fuel cell stack in the CHP device may operate within a temperature range of 450-650° C.

According to embodiments of the present invention, such systems allow operation of a boiler unit independently from the CHP device and allows an optional installation of the CHP device subsequently. The boiler unit can thus be manufactured independently of the CHP device. The boiler unit and the CHP device can be shipped independently and separately to an installation site. They may be installed in two stages, even where they are both to be operated immediately on activation of the unit. As the CHP unit and boiler unit are each heavy, wall mounting of the boiler unit becomes easier where the weight of the CHP device can be installed after the boiler unit has been mounted on the wall. In this way, an installer installing the boiler unit on site can install and mount the boiler unit and then lift the CHP device into the boiler unit, resulting in reduced installation complexity, reduced labour requirements, reduced cost and health and safety benefits. By having the CHP device and heating device in a single boiler unit, a single control unit can be used to run both. In this way, any malfunction with the heating device or the CHP device can be detected and the remaining device can be controlled to take account of the malfunction.

Boiler units according to embodiments of the invention can be used in domestic and commercial applications. They provide an easy upgrade path to include a CHP device after the installation of a boiler unit with minimal interruption to the service provider by the boiler unit. Upgrading of the CHP device is simple as the old device can be removed and replaced with a new, upgraded, device. If desired, the CHP device can be removed subsequently, without impacting on the heating of hot water provision of the boiler unit.

BRIEF DESCRIPTION OF THE DRAWINGS

Embodiments of the invention will now be described, purely by way of example, with reference to the following drawings, in which:

FIGS. 1a and 1b show a boiler unit according to a first embodiment of the invention;

DETAILED DESCRIPTION OF EMBODIMENTS OF THE INVENTION

Figure 2A:
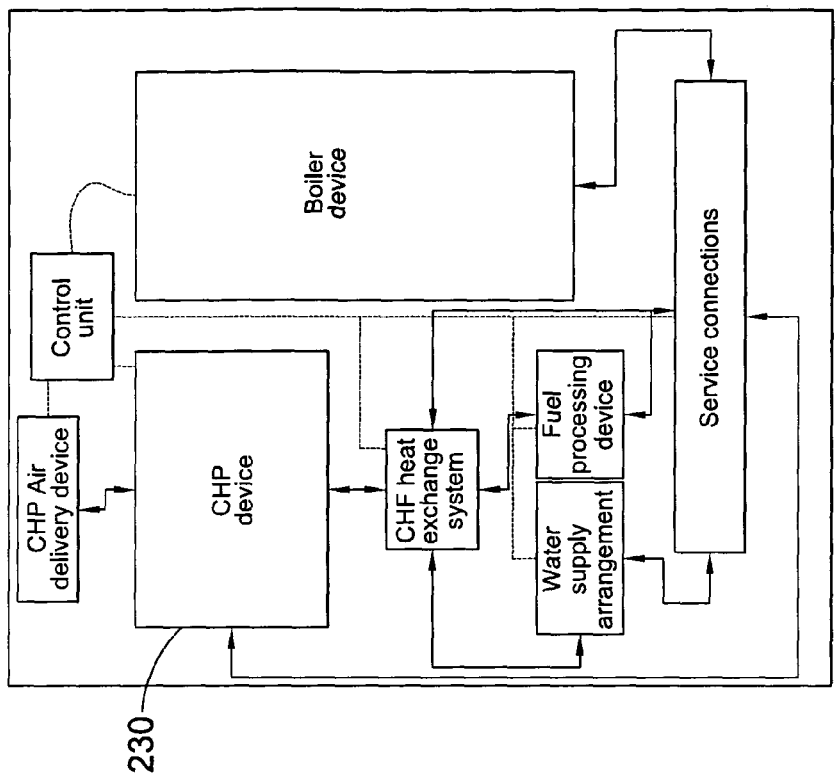
FIGS. 2a and 2b show a boiler unit according to a second embodiment of the invention.

According to embodiments of the invention, as described herein, there is provided a boiler unit 100 configured to receive a solid state combined heat and power generating device or to receive a stirling/rankine engine (CHP device) 130. The boiler unit 100 comprises a heating device 110 to produce heat and a control unit 120 to independently control each of the heating device 110 and the CHP device 130, when installed. The boiler unit 100 is operable without the CHP 130 being present.

In the embodiments described herein, the heating device 110 is a boiler device 110. However, many kinds of heating devices can be used as being known to a person skilled in the art. The boiler device 110 described herein consists of a standard condensing boiler device 110, which includes at least one condensing heat exchanger for transferring thermal energy generated by burning fuel gas in air in a boiler burner unit to a thermal energy transfer medium. This transfer medium is typically water in domestic heating applications. Additives, such as a corrosion inhibitor may be added to the transfer medium, which, in the present embodiment, is water.

Turning now to the figures, FIGS. 1a and 1b show a boiler unit 100 according to a first embodiment of the invention. FIG. 1a shows the boiler unit in an operating condition in which a void 130' is provided which can receive the CHP device 130. The boiler unit is shown in FIG. 1b with the CHP device 130 installed. Both the boiler device 110 and the CHP device are connected to and controlled by the control unit 120. The use of a single control unit 120 ensures that the devices can be controlled to operate as required and independently of one another.

The boiler unit 100 also includes a service connection manifold 140 for connecting both the boiler unit 100 to external surfaces required for the boiler unit to operate when only the boiler device 110 is installed, and also for the combined heat and power device 130 to operate when both devices are installed in the boiler unit 100. The service connection manifold of the present invention consists of standard boiler device service connections as well as combined heat and power device connections. The standard boiler device connections, where there is a thermal energy store, include connection required for the fuel supply, boiler device 110, thermal energy transfer medium feed, boiler device thermal energy transfer medium return, electrical connection to power the boiler device and a condensate drain line. The additional service connections provided for the combined heat and power device include a combined heat and power generating device thermal energy transfer medium feed, and a thermal energy transfer medium return. An electrical connection to a fused electrical distribution box may be provided instead of the electrical connection to the boiler device, or as well as the electrical connection to the boiler device. Further, at least one cable connecting the control unit 120 to external sensors, control boxes and/or a site energy management system may be provided. Alternatively, these may be connected by a wireless link. The provision of separate thermal energy transfer medium feeds and returns for the boiler device and combined heat and power device insure that the devices can fully function independently of one another.

The heating system of the present embodiment is a "wet" heating system, in which liquid is used as the heat transfer medium. In this embodiment, the diverter valve for diverting the thermal energy transfer medium from the thermal energy store to the heating system is located outside the boiler unit. Conveniently, the diverter device is located with the thermal energy transfer medium pump beside the thermal energy store. In some cases it is possible for the diverter valve to be located in the vicinity of the boiler unit.

It is possible for the CHP device thermal energy transfer medium feed and return line connections to the thermal energy store to be installed at the same time as the boiler unit is installed, or when the CHP device is installed if the CHP device is installed at a later date to the boiler unit. This is discussed in more detail below.

If the thermal energy transfer medium pump and diverter valve are located within the boiler unit, an additional service connection is included; the service connections then include the fuel supply, a thermal energy transfer medium feed to the wet heating system, a thermal energy transfer medium feed to the thermal store, a thermal energy transfer medium return, a CHP device thermal energy transfer medium feed, a CHP device thermal energy transfer medium return, an electrical connection to power the boiler device, and a condensate drain line.

Also contained in the boiler unit is a controllable CHP air delivery device 150, for example, a controllable motor and blower, that is used to controllably provide air to the CHP device.

The boiler unit 100 also has an air feed and an exhaust feed. The exhaust is preferably a balanced flue exhaust enabling the boiler unit 100 to operate in a sealed or semi-sealed state, with the air feed and the boiler exhaust using the concentric conduits contained in the balanced flue arrangement. The air feed and the exhaust feed are connected to the boiler device 110 and each feed also has a separate junction with a capped pipe located close to a readily accessible void within the boiler unit. The readily accessible void 130' is designed for simple access from the front of the unit once the unit cover is taken off, and is designed to accept the installation of a CHP device 130 into the void 130' and for simple assembly and connection of the pipes and cables required to connect the CHP device 130 to the control unit 120 and service connection manifold 140 and other CHP device support components that are mounted in the boiler unit 100.

The condensate drain allows unwanted condensate from the at least one boiler unit condensing heat exchanger and unwanted condensate from the CHP heat exchange system condensing heat exchangers as well as any unwanted de-ionised water from the water supply arrangement to drain away from the boiler unit.

In the first embodiment, the CHP device 130 includes a CHP heat exchange system 132, a water supply arrangement 134 and a fuel processing device 136 within the CHP device 130. These are all retained within the CHP device unit and are installed into the boiler unit 100 together with a fuel cell module 138, which produces the heat and power of the CHP device 130. It is possible to make use of other CHP devices such as a stirling engine or a rankine engine. In the present embodiment, the fuel cell module 138 is an intermediate temperature SOFC unit operating at between 450° C.-650° C., made up of a fuel cell stack.

A cover is provided around the fuel cell stack assembly. Also provided are a fuel cell stack compression means, a base plate to which the fuel cell stack assembly and cover and fuel cell stack compression means are connected, a tail gas burner unit, a fuel reformer processing unit (consisting of a steam generator, a steam and fuel gas mixer, a steam reformer unit, a heat exchange unit to transfer thermal energy from the reformate exiting the reformer area to the seam generator unit, a heat exchanger to transfer thermal energy from the exhaust stream from the tail gas burner unit to the fuel processor unit) electrical connections to the sensors contained within the fuel cell module and power leads connected to the electrical output points from the fuel cell stack assembly, and a gas to gas heat exchange unit for allowing thermal energy to be transferred between the exhaust gas exiting from the steam generator heat exchanger unit and the incoming oxidant gas to the fuel cell module, and piping to connect the components of the fuel cell module together and connect to the CHP air delivery device, the water supply arrangement, the CHP heat exchange system, the fuel cell device and the boiler unit, and thermal insulation means providing thermal insulation around the fuel cell module.

The water supply arrangement 134 consists of a tank to capture the condensate that is condensed from the fuel cell stack anode off-gas and from the tail gas burner exhaust, a initial de-ionised water fill line, a drain line and valve, a controllable water pump, a replaceable water deioniser unit and a flow sensor or switch.

The fuel processing device 136 consists of a replaceable desulphurisor unit, a pressure sensor, at least one fuel isolation valve, a controllable fuel pump, a fuel expansion volume, a fuel flow sensor, controllable flow valves for the supply of fuel gas to the CHP device and to the tail gas burner, and, optionally, a valve to fuel line assembly leak testing during installation or as part of the boiler unit assembly process.

The CHP heat exchange system 132 includes at least one heat exchange device. In the preferred embodiment, the CHP heat exchange system 132 includes a first heat exchange device, a second heat exchange device, and a third heat exchange device.

The first heat exchange device is a gas-to-gas heat exchanger for exchanging the thermal energy in the fuel cell stack anode off-gas to the incoming air to the fuel cell stack cathode side. The first heat exchange device is positioned up-stream on the air side of the fuel cell module and in particular of the gas to gas heat exchange unit for allowing thermal energy to be transferred between the exhaust gas exiting from the steam generator heat exchanger unit and the incoming oxidant gas to the fuel cell module.

There is a controllable air by-pass that allows ambient temperature air to be fed to the fuel cell stack cathode inlet by bypassing both the first heat exchange device and the steam generator heat exchanger unit and the incoming oxidant gas to the fuel cell module.

The second heat exchange device is a condensing heat exchanger that allows thermal energy from the fuel cell stack anode-off gas to be transferred to the CHP thermal energy transfer medium. The second heat exchange device is located down-stream of the first heat exchange device.

The third heat exchange device is a condensing heat exchanger that allows thermal energy to be transferred from the tail-gas burner exhaust stream to the CHP thermal energy transfer medium. The third heat exchange device is located down-stream of the second heat exchange device for the CHP thermal energy transfer medium, and down-stream on the tail gas burner exhaust stream of the gas to gas heat exchange unit for allowing thermal energy to be transferred between the exhaust gas exiting from the steam generator heat exchanger unit and the incoming oxidant gas to the fuel cell module.

As well as the heat exchanger arrangements described herein, other heat exchange configurations could also be included, as would be appreciated by a person skilled in the relevant art.

When the CHP device 130 is being installed into the boiler unit 100, the boiler device 110 is preferably shut down and electrically isolated, and the fuel gas isolated. The CHP device 130 is located into the easily accessible void 130' in the boiler unit 100 and the relevant fluid and electrical and control connections are made. The fluid connections made are the fuel gas connection to the fuel processing system, air feed pipe of the CHP device to the CHP air delivery device, condensate line from the boiler unit to the water supply arrangement drain lines, CHP thermal energy transfer medium feed in and feed out lines, electrical power cables from the CHP device to the control panel, and control and sensor cables from the CHP device to the control panel.

The boiler unit 100 may be shipped and installed without the de-sulphuriser unit installed. In these instances a dummy desulphuriser unit is installed initially, which is exchanged for an active desulphuriser unit when the CHP device 130 is installed.

The CHP device 130 is pressure tested on the air and on the fuel side as part of the CHP device assembly end-of-line testing process. A pressure test can be additionally carried out on the CHP device 130 just prior to installation into the boiler unit. This can be achieved by capping the tail gas burner exhaust line and pressure testing from the fuel supply isolation valve to ascertain if there is a fuel gas leak from any of the connections made to the CHP device 130, or within the CHP device 130. If the CHP device 130 has not been shipped with the deioniser water device filled with deionised water, then this is carried out prior to pressure testing the fuel side, to prevent gas venting down the steam generator, through the water supply arrangement and out of the drain line. Filling the de-ioniser with de-ionised water provides sufficient back pressure to prevent the fuel gas flowing down the steam line in the steam generator during a pressure test.

Once the pressure test is confirmed, then the CHP device exhaust can be connected to the balanced flue exhaust for the boiler device by uncapping the junction of the balanced flue exhaust for the boiler device. If required the electrical output from the CHP control unit can be connected to a fused electrical distribution board, or similar such device outside of the boiler unit. Then the electrical power and the fuel gas can be de-isolated.

On powering up, the control unit carries out an assessment of the devices available, including a diagnostics check. In the event that the diagnostics show that there is a significant fault with one of the devices, then the control unit will not allow that device to operate. Once the control unit has completed its diagnosis the CHP unit is ready to operate. Operation of the CHP unit can be based on an installer signal to verify operation of the CHP unit, a command from a remote control unit, a command from thermostat indicating that heat energy is required for the thermal energy store or for the wet heating system, or other such commands.

The operation of a suitable CHP device is well known to a person skilled in the art.

During operation of the boiler unit 100 when the CHP device 130 is installed, if the control unit 120 detects that one of the devices 110, 130 is not functioning within acceptable specification, then it can shut down that device. In the event that the boiler device 110 is shut down, the boiler unit 100 can still provide electrical power output and thermal energy output from the CHP device 130. In the event that the CHP device 130 is shut down, the boiler unit 100 can still provide thermal energy output from the boiler device 110.

With this arrangement, it is possible for either the boiler device 110 or the CHP device 130 to be maintained, replaced or upgraded during the operating life of the boiler unit 100.

Figure 2B:
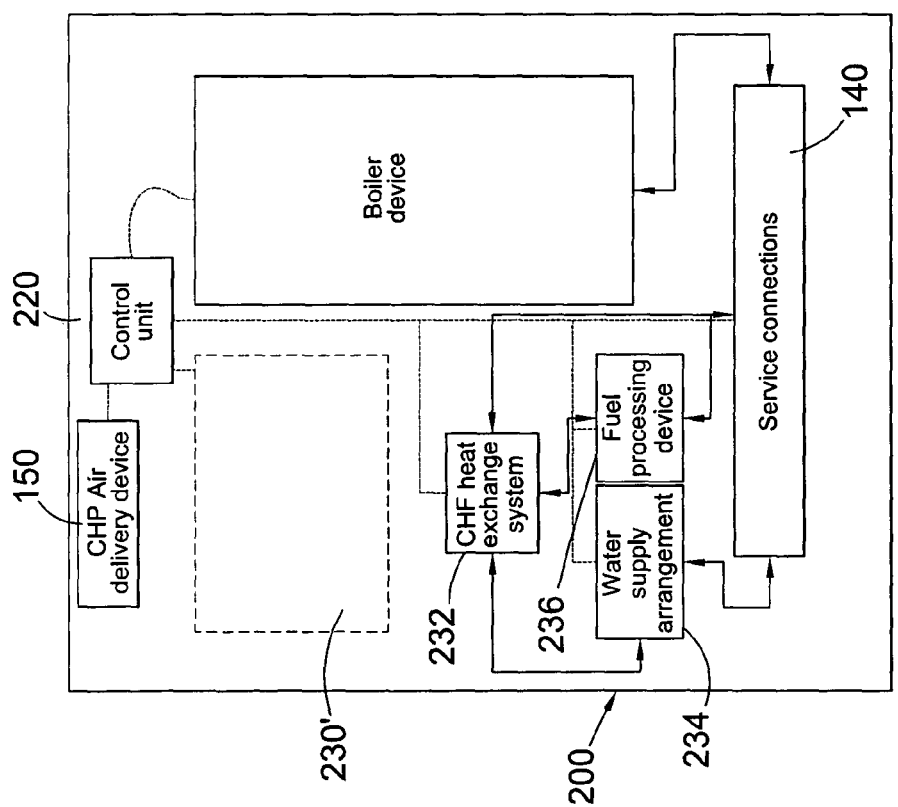

FIGS. 2a and 2b show a boiler unit 200 according to a second embodiment of the invention. As the second embodiment is similar to the first embodiment, described above, only differences will be described and like reference numerals refer to like elements and systems. The second embodiment differs from the first embodiment in that the CHP heat exchange system 232, water supply arrangement 234, and fuel processing device 236 are provided in the boiler unit 200, and are not provided in the CHP device 230. Therefore, in the second embodiment, these systems 232, 234, 236 are permanently installed in the boiler unit 200 and are not installed and removed with the CHP device 230. The CHP heat exchange system 232, water supply arrangement 234 and fuel processing device 236 are as described with reference to the first embodiment above, with the exception that they are provided in the boiler unit 200, rather than in the CHP device 230. In the second embodiment, the CHP device includes the fuel cell module.

As in the first embodiment, when the CHP device 230 is being installed into the boiler unit, the boiler device 110 is preferably shut down and electrically isolated and fuel gas isolated. The CHP device 230 is located into the easily accessible void 230' in the boiler unit 200 and the relevant fluid and electrical and control connections are made. However, as the CHP device 230 does not include all of the systems included in the first embodiment, these are connected during installation of the CHP device 230. The connections made are of the fuel gas connection from the fuel processing system to the tail gas burner and to the steam reformer, air and tail gas burner and anode off gas connections to the CHP heat exchange system either as individual connections or as a combined connection, air feed pipe of the CHP device to the CHP air delivery device and an optional air by-pass line between the CHP device and the CHP air delivery device, deionised water feed to the steam reformer unit, electrical power cables from the CHP device to the control panel, control and sensor cables from the CHP device to the control panel. The control unit 220 is connected to each of the systems 232, 234, 236. The control unit is also connected to the CHP device 230, when it is installed.

As in the first embodiment, the boiler unit may be shipped and installed with a dummy desulphuriser, which is replace on installation of the CHP device 230. The testing may be as in the first embodiment. All connections made when the CHP device 230 is installed may be tested.

Figures 3A, 3B:
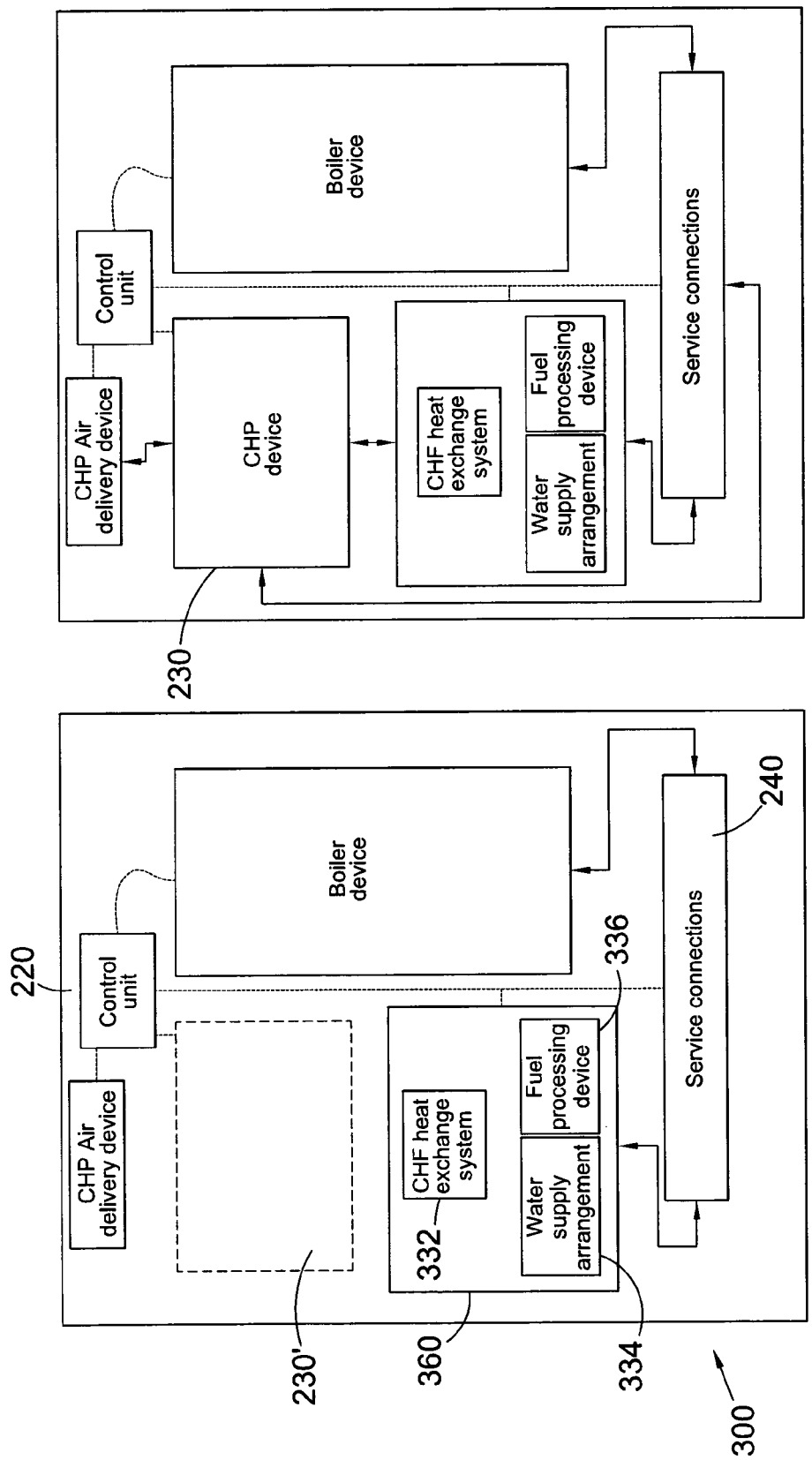
FIGS. 3a and 3b show a boiler unit according to a third embodiment of the invention.

In a third embodiment, which is shown in FIGS. 3a and 3b, all like references refer to like elements and systems from the first and second embodiments (including boiler unit 300 and service connection manifold 240). In the third embodiment, the CHP heat exchange system 332, water supply arrangement 334 and fuel processing device 336 operate and are formed in the same way as in the second embodiment described above. However, they are provided in a single ancillary unit 360, which is connected to the service connection manifold, and the control unit. In this embodiment, all of the components are housed in a single unit, which can be installed into the boiler unit in one action. All other aspects of the embodiment are as previously described.

Figure 4B:
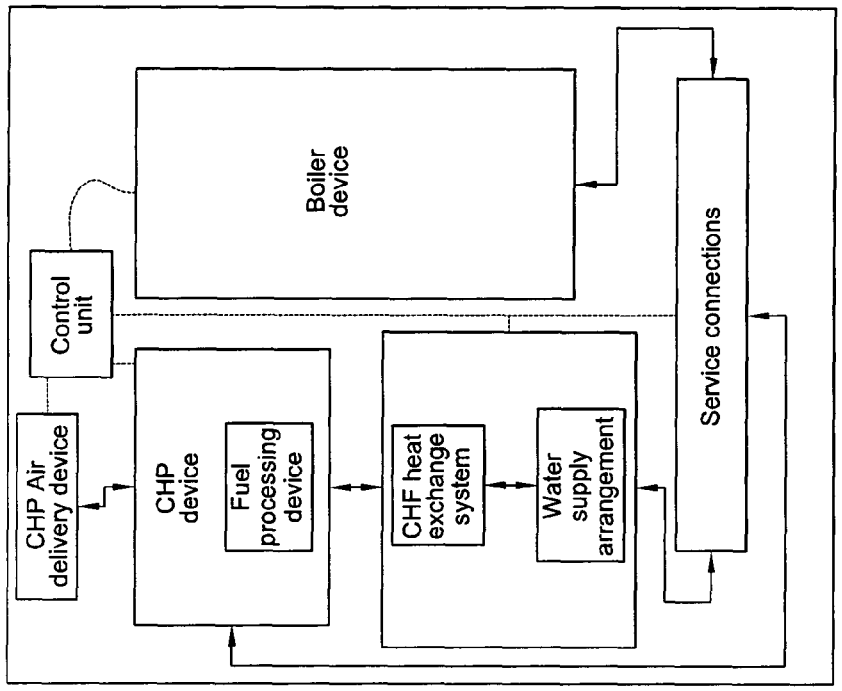
FIGS. 4a and 4b show a boiler unit according to a fourth embodiment of the invention.
Figure 4A:
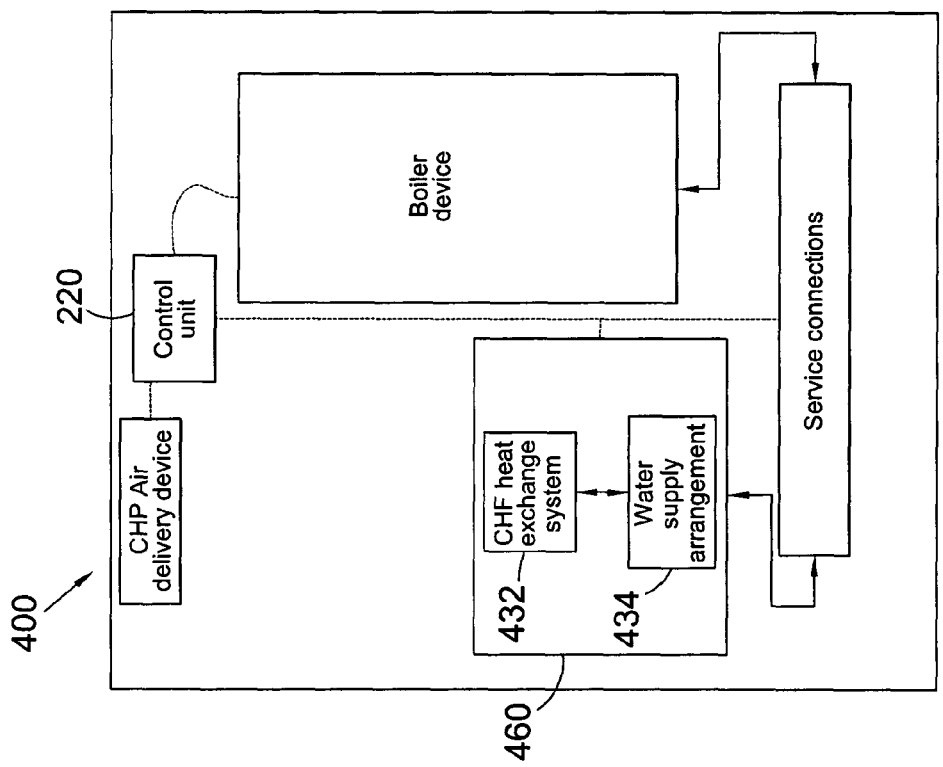

In a fourth embodiment, which is shown in FIGS. 4a and 4b, all like references refer to like elements and systems from the first and second embodiments (including boiler unit 400, CHP heat exchange system 432, water supply arrangement 434, and single ancillary unit 460). In the fourth embodiment, the CHP device includes the fuel processing device, but not the CHP heat exchange system or the water supply arrangement, which are together provided in a separate unit, as in the third embodiment. All other aspects of the fourth embodiment are as previously described.

Other embodiments can exist where aspects of the CHP device support components are installed as part of the boiler unit during boiler unit manufacture and other components are included as part of the CHP device.

In all embodiments, installation on a wall may involve a mounting bracket being affixed to the wall such that the installed unit would be square and secured to the wall. Such a mounting bracket may include a levelling sight bubble to make installation easier. Once the mounting bracket is installed, the main boiler unit frame can be located onto the mounting bracket and secured in place if required. At this point the CHP device is not installed. The connections to the CHP device are easily recognisable and are physically capped. Upon powering up the boiler unit, the control unit detects that there are no confirmatory signals from the CHP device and will not allow the CHP device to be operated, including not allowing the gas control valves to the CHP device to open.

The service connections to the boiler unit can be made and physically tested before the electrical power is applied to the boiler unit. In operation, the boiler the control unit recognises the available devices and only enables those that are connected to the control unit. If a device is installed but not connected to the control unit then that device is not instructed to operate by the control unit. The control unit will go through a control unit start-up procedure before carrying out system diagnostics. Once the system diagnostics indicate that the boiler unit is ready to operate will the control unit allow the boiler unit to operate. Boiler operation can occur by a signal generated by the installation engineer at the unit, or manually or electronically via a programming panel or power management system remote from the control unit. The boiler will then operate as per a normal boiler unit, responding to heat demand requirements for wet system heating or for providing thermal energy to the thermal store.

The boiler unit has sensors to detect if out of normal range events occur that require the boiler device to shut down. Such events include drop in fuel pressure below a certain point, blockage to the exhaust feed, over-temperature in the boiler unit, loss of electrical power, drop in water pressure below a certain point, failure of the boiler device to ignite after the specified number of attempts, or failure of the boiler burner to burn sufficiently.

Thus, the boiler unit can be installed and operated as a boiler only unit without the addition of the CHP device.

Figure 5:
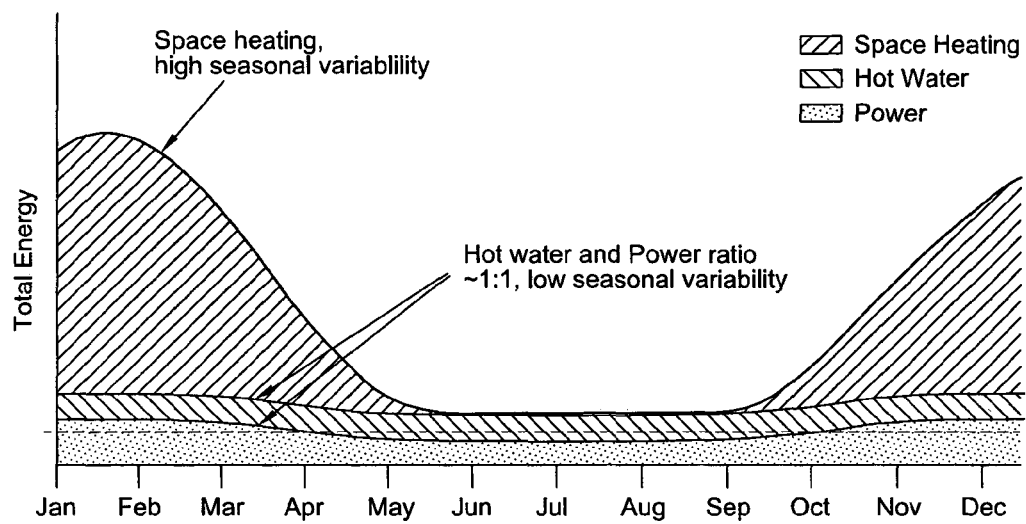
FIG. 5 shows typical seasonal variation representation for electrical power, heating energy and hot water energy requirements for a typical U.K. domestic application.

FIG. 5 shows typical seasonal variation for electrical power, heating energy and hot water energy requirements for a UK domestic application. As can be seen, a high variation in space heating occurs seasonally. However, the power and hot water supply remain approximately constant through the year. The ratio of hot water and power is approximately 1:1, which makes a fuel cell highly suitable for the production of this hot water and power, as fuel cells generally provide heat and power at a ratio of around 1:1. The excess seasonal space heat requirement can then be provided by a standard boiler in the boiler unit. If a ratio of higher than 1:1 is provided for heat to power, in the summer months, heat must be wasted in order to generate sufficient power, or the system must be run at reduced output and external power received from the electricity grid. The higher the heat-power ratio of the CHP device, the less power can be generated without waste of heat, especially during the summer months.

The present invention has been described above with reference to specific embodiments. Many additions, omissions and substitutions will be apparent and such modifications, omissions and substitutions may be employed without departing from the spirit and scope of the invention.

The invention claimed is:

1. A boiler unit and an enclosure in which the boiler unit is housed, the boiler unit capable of receiving a solid state combined heat and power generating device, the boiler unit comprising:
 a heating device to produce heat; and
 a control unit to independently control each of the heating device and the solid state combined heat and power generating device,
 wherein the control unit is configured to allow the boiler unit to operate when the solid state combined heat and power device is not present, whereby the boiler unit is operable and controllable by the control unit without the solid state combined heat and power generating device being present, and
 wherein the enclosure includes a void to receive the solid state combined heat and power generating device.

2. A boiler unit according to claim 1, wherein the void is an accessible void sized and accessible by removing at least part of the enclosure so as to receive the solid state combined heat and power generating device.

3. A boiler unit according to claim 1, further comprising a heat recovery system for the solid state combined heat and power generating device within the boiler unit.

4. A boiler unit according to claim 1, wherein the control unit is configured to allow operation of each of the heating device and the solid state combined heat and power generating device while the other is not operating.

5. A boiler unit according to claim 1, wherein the boiler unit does not
 require alteration to receive the solid state combined heat and power generating device.

6. A boiler unit according to claim 1, wherein the control unit includes
 a single control printed circuit board to control each of the heating device and the solid state combined heat and power generating device.

7. A boiler unit according to claim 1, wherein diagnostics managers
 are provided in the control unit, for the heating device and the solid state combined heat and power generating device, which are respectively independent of one another.

8. A boiler unit according to claim 1, including a solid state combined heat and power generating device.

9. A boiler unit according to claim 8, wherein the heating device and the solid state combined heat and power generating device can be operated independently of one another.

10. A boiler unit according to claim 8, wherein the solid state combined heat and power generating device produces usable heat and power.

11. A boiler unit according to claim 8, wherein the solid state combined heat and power generating device produces only usable power.

12. A boiler unit according to claim 1, the boiler unit being wall mountable.

13. A boiler unit according to claim 1, wherein the heating device includes a boiler.

14. A boiler unit according to claim 1, wherein the solid state combined heat and power generating device and the heating device include separate circulatory systems for distributing heat generated by the respective devices.

15. A boiler unit according to claim 1, further comprising a heat recovery system for the solid state combined heat and power generating device within the boiler unit and where the heat recovery system is independent of the heating device.

16. A boiler unit according to claim 1, further comprising a fuel processing system for the solid state combined heat and power generating device.

17. A boiler unit according to claim 16, the fuel processing system including a replaceable de-sulphuriser component.

18. A boiler unit according to claim 1, further comprising a water supply arrangement for the solid state combined heat and power generating device.

19. A boiler unit according to claim 18, the water supply arrangement including a replaceable de-ioniser unit.

20. A boiler unit according to claim 1, wherein the boiler unit is a domestic boiler unit.

21. A boiler unit and an enclosure in which the boiler unit is housed, the boiler unit capable of receiving a Rankine or a Stirling engine, the boiler unit comprising:
  a heating device to produce heat; and
  a control unit to independently control each of the heating device and said Rankine or said Stirling engine,
  wherein the boiler unit is operable without the Rankine or the Stirling engine being present, and
  wherein the enclosure includes a void to receive the Rankine or the Stirling engine.

* * * * *